May 9, 1950   G. E. DATH   2,506,708
FRICTION SHOCK ABSORBING MECHANISM
Filed May 25, 1945   3 Sheets-Sheet 1
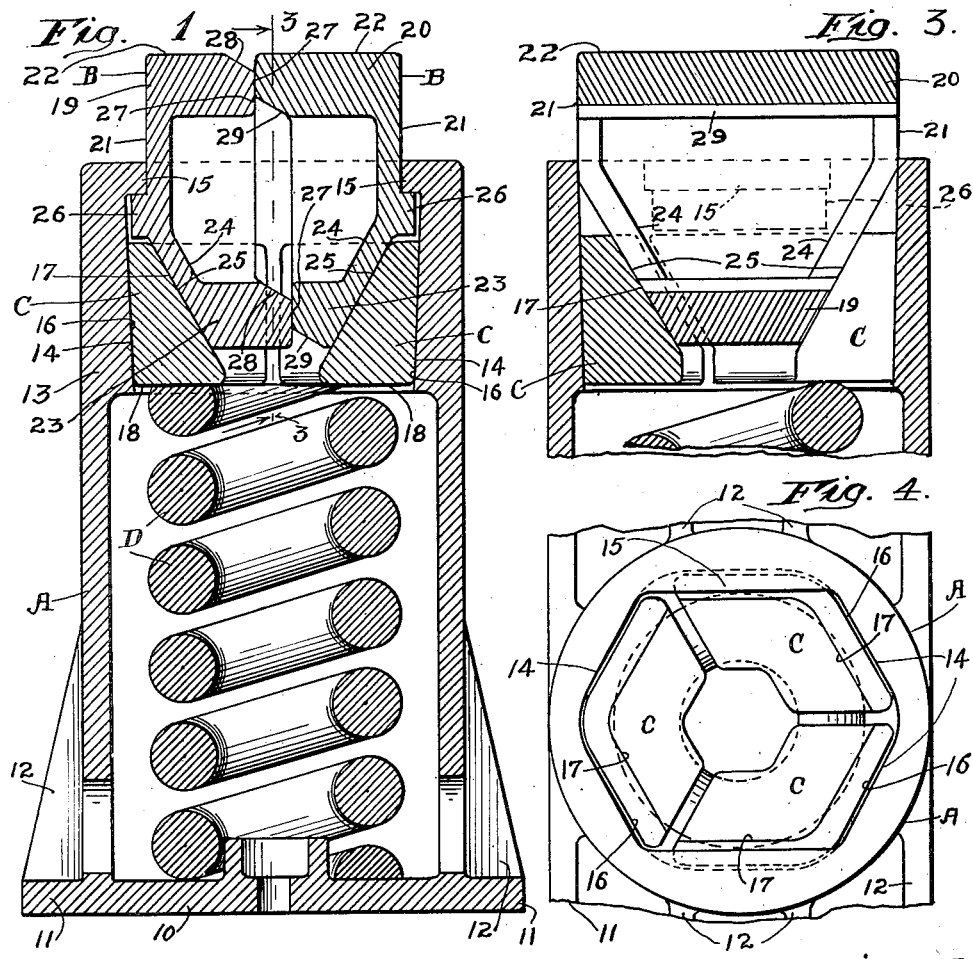
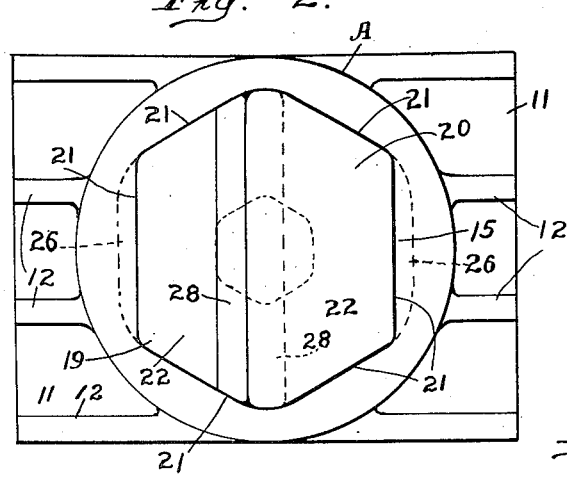
Inventor:
George E. Dath.
By Henry Fuchs
Atty.

May 9, 1950 G. E. DATH 2,506,708
FRICTION SHOCK ABSORBING MECHANISM
Filed May 25, 1945 3 Sheets-Sheet 2

Inventor:
George E. Dath
By Henry Fuchs.
Atty.

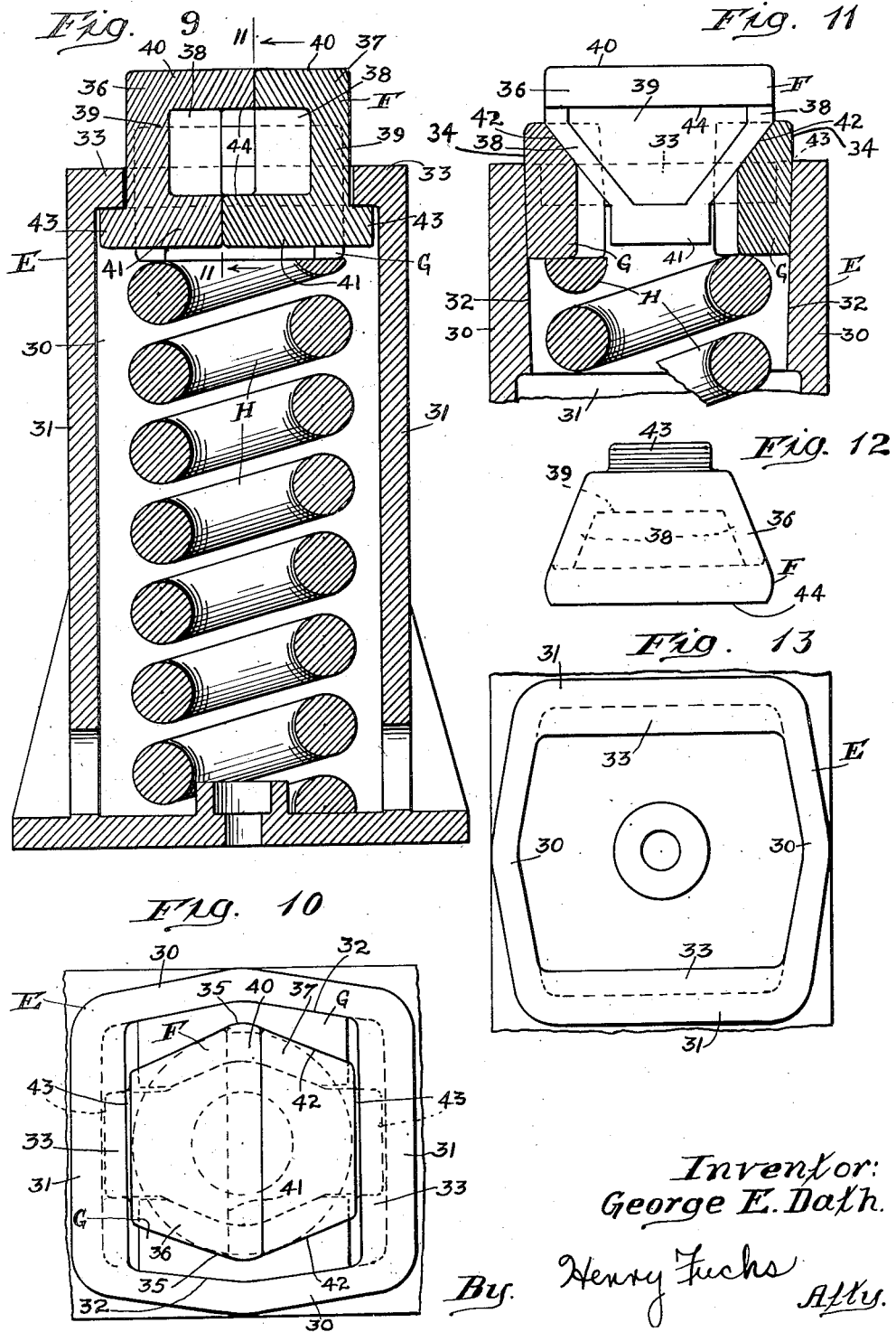

Patented May 9, 1950

2,506,708

UNITED STATES PATENT OFFICE 2,506,708

FRICTION SHOCK ABSORBING MECHANISM

George E. Dath, Mokena, Ill., assignor to W. H. Miner, Inc., Chicago, Ill., a corporation of Delaware Application May 25, 1945, Serial No. 595,862

10 Claims. (Cl. 213—34)

1

This invention relates to improvements in friction shock absorbing mechanisms.

The main object of the invention is to provide a friction shock absorbing mechanism more particularly adapted for railway draft riggings, comprising a friction casing, a friction clutch including a central wedge block and friction shoes, and a spring resistance opposing movement of the clutch inwardly of the casing, wherein the parts of the mechanism are held assembled by shouldered engagement between the wedge and casing, the wedge being contractible to permit insertion thereof within the casing, and when in expanded condition is held in shouldered engagement with the casing to limit outward movement of the wedge and maintain the mechanism assembled.

A more specific object of the invention is to provide a friction shock absorbing mechanism, as specified in the preceding paragraph, wherein the wedge is in the form of a collapsible, split, sectional member having lateral flanges in shouldered engagement with interior flanges on the casing to limit outward movement of the wedge and thereby hold the mechanism assembled, the sections of the wedge having cooperating spreading projections thereon which are brought into operative position by relative lengthwise displacement of the sections to expand the wedge and establish said shouldered engagement between the flanges thereof and those of the casing.

Other objects of the invention will more clearly appear from the description and claims hereinafter following.

Figure 6:
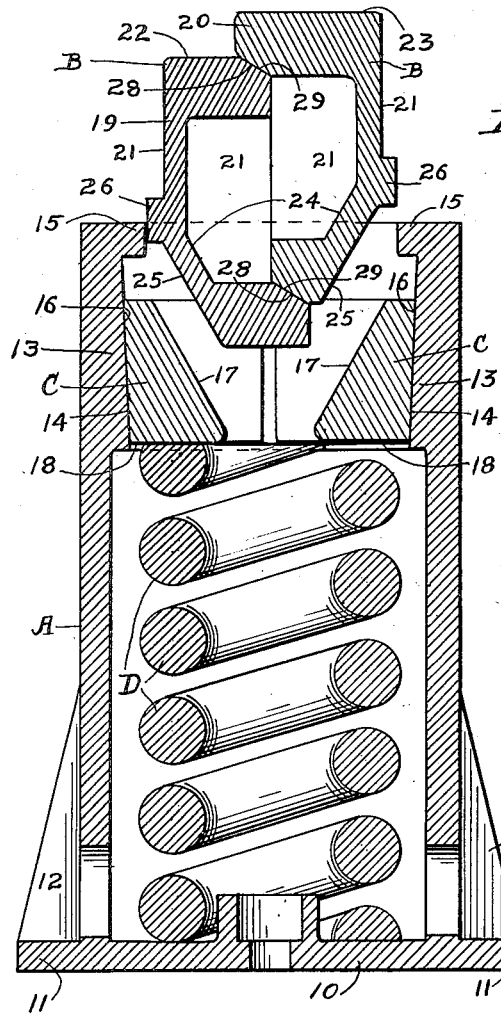
Figure 7:
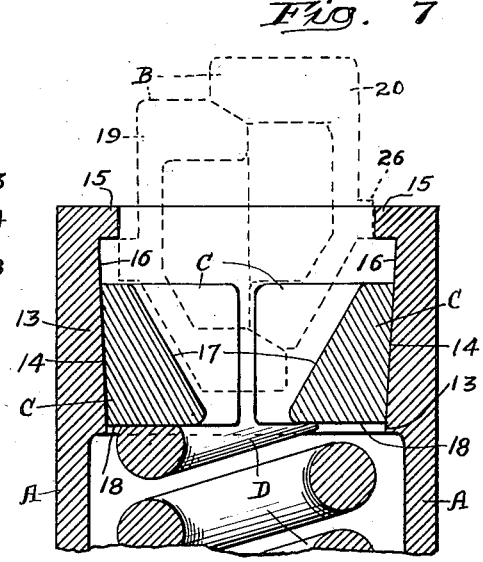
Figure 8:
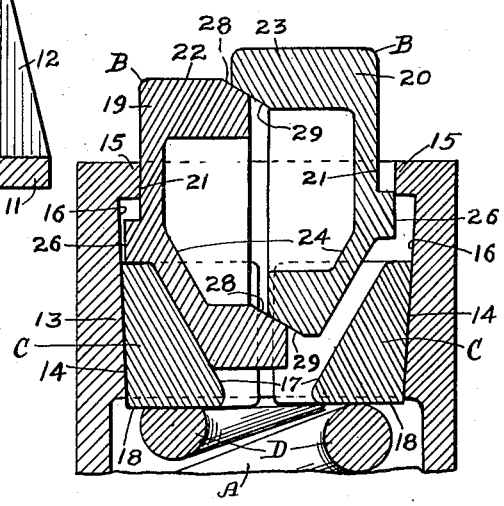

In the drawings forming a part of this specification, Figure 1 is a transverse, vertical sectional view of my improved friction shock absorbing mechanism. Figure 2 is a top plan view of Figure 1. Figure 3 is a transverse, vertical sectional view, corresponding substantially to the line 3—3 of Figure 1 of the upper end portion of the mechanism. Figure 4 is a top plan view of Figure 3 with the wedge member omitted and the follower flanges of the friction casing broken away. Figure 5 is a top plan view of the left hand section of the wedge block, as shown in Figure 1, the side walls of the block being indicated in dotted lines. Figure 6 is a view, similar to Figure 1, with the parts in somewhat different position, illustrating a step in the operation of assembling the mechanism. Figures 7 and 8 are views, similar to Figure 6, illustrating the assembling of the mechanism, the lower portion of the mechanism being broken away, Figure 7 showing the sectional wedge in dotted lines. Figure 9 is a view, similar to Figure 1, illustrating another embodiment of the invention. Figure 10 is a top plan view of Figure 9, the follower flange of the friction casing being broken away. Figure 11 is a transverse, vertical sectional view, corresponding substantially to the line 11—11 of Figure 9, the lower portion of the mechanism being broken away. Figure 12 is a top plan view of one of the sections of the wedge block, the section illustrated being at the left hand side of Figures 9 and 10, the side walls of the block being shown in dotted lines. Figure 13 is a top plan view of Figure 11, with the wedge block, friction shoes, and spring omitted.

Referring first to the embodiment of the invention illustrated in Figures 1 to 8 inclusive, my improved friction shock absorbing mechanism comprises broadly a friction casing A; a two piece split wedge member B; three friction shoes C—C—C; and a spring resistance D.

The casing A is in the form of a cylindrical, tubular member open at its upper end and closed at its bottom end by a transverse wall 10. The wall 10 is extended laterally beyond the opposite sides of the casing, thereby providing flanges 11—11, which form an integral follower member on said casing. When employed in railway draft riggings, the friction shock absorbing mechanism illustrated is disposed in horizontal position and the follower member formed by the flanges 11—11 provides the rear follower of the draft rigging. The parts are preferably reenforced by longitudinally extending webs 12—12 formed integral with the flanges 11—11 and the side walls of the casing A. The walls of the casing A are inwardly thickened at their upper ends, as most clearly shown in Figure 1, said thickened portion of the casing forming the friction shell section 13 thereof, which is preferably of hexagonal, interior cross section. The friction shell section 13 of the casing A is provided with three longitudinally extending friction surfaces 14—14—14 of V-shaped, transverse cross section, which converge inwardly or downwardly. At the open upper end thereof, the casing has a pair of inturned flanges 15—15 at opposite sides thereof which overhang opposed walls of the hexagonal interior of the shell. The flanges 15—15 form outer stops for arresting outward movement of the wedge block.

The friction shoes C are three in number and are arranged symmetrically about the central longitudinal axis of the mechanism. Each shoe C has an outer friction surface 16 of V-shaped, transverse section, which cooperates with the corresponding V-shaped friction surface 14 of the casing. On the inner side, each shoe is provided with a wedge face 17 which is of V-shaped, transverse section. The inner ends of the shoes are substantially flat, thereby providing abutment faces 18 on which the spring D engages.

The wedge member B is in the form of a lengthwise split, hollow block of hexagonal shape, comprising sections 19 and 20. Each section of the wedge member provides three sides of the hexagon. The sections 19 and 20 are of similar design, except as hereinafter pointed out. Each section of the wedge member comprises three side walls 21—21—21 and horizontally disposed top and bottom walls 22 and 23. The side walls 21—21—21 of each section form three sides of the split, hexagonal wedge member, one of said walls extending transversely of each section of the wedge member and the remaining two walls projecting inwardly from the opposite ends of said first named wall in diverging relation. At the lower end of the wedge member B, the side walls 21—21—21 of each section are inclined inwardly toward the longitudinal central axis of the mechanism, as indicated at 24—24—24, thus providing the wedging portion proper of the wedge member. The assembled wedge member thus presents three inwardly converging wedge faces 25—25—25 at its lower end of V-shaped, transverse cross section adapted to engage respectively the V-shaped wedge faces 17—17—17 of the three shoes C—C—C. The portions of the side walls 21—21—21 of each section of the wedge member, above the wedge faces 25 thereof, extend vertically and present substantially flat, outer surfaces. At opposite sides thereof, the split wedge member B is provided with laterally outwardly projecting, transverse, horizontally disposed retaining ribs or flanges 26—26, the flange 26 of each section being formed on the transversely disposed wall 21 thereof, as clearly illustrated in Figures 1 and 2. As shown most clearly in Figure 1, the top and bottom walls 22 and 23 of the two sections 19 and 20 of the wedge member are considerably thicker than the side walls 21—21—21 and have vertically disposed inner end faces 27—27 which are in abutment with each other, that is, the vertical inner end faces 27—27 of the top and bottom walls of the section 19 abut the vertical inner end faces 27—27 of the top and bottom walls of the section 20. The top wall 22 of the section 19 has its vertical inner end face 27 in vertical alignment with the inner side edges of the inwardly diverging side walls 21—21 of said section, and the bottom wall 23 thereof projects laterally beyond said side walls 21—21, as clearly shown in Figure 1, and the top wall 22 of the section 20 projects laterally inwardly beyond the diverging side walls 21—21 thereof into abutting relation with the vertical end face of the top wall 22 of the section 19. The bottom wall 23 of the section 20 has its end face 27 in alignment with the inner edges of the diverging side walls 21—21 and abuts the inner end face 27 of the projecting bottom wall 23 of the section 19. The projecting portions of the top wall 22 of the section 19 and of the bottom wall 23 of the section 20 thus, in effect, form spacing flanges or lugs for holding the two sections of the wedge member spread apart with the retaining flanges 26—26 thereof engaged underneath the flanges 15—15 of the casing A. The top and bottom walls 22 and 23 of the section 19 of the wedge member are beveled off at the upper corners along the inner end edges to provide inclined surfaces 28—28 forming cam faces, and the top and bottom walls 22 and 23 of the section 20 are beveled off, at the lower corners along the inner end edges to provide inclined underneath surfaces 29—29 forming cam faces adapted to cooperate with the cam faces 28—28 of the section 19 in assembling the mechanism. As shown most clearly in Figure 6, the parts of the two sections 19 and 20 of the wedge member B are so designed and proportioned that the wedge member may be laterally contracted or collapsed by bringing said sections together with the section 20 displaced upwardly with respect to the section 19 and the vertical inner side edges of the diverging walls 21—21 and 21—21 of the two sections in abutment, and the inclined end surfaces 29—29 of the walls 22 and 23 of the section 20 in full bearing engagement with the inclined end surfaces 28—28 of the walls 22 and 23 of the section 19. The wedge member as thus contacted is reduced in size so that the flanges or ribs 26—26 thereof will pass freely through the opening between the stop flanges 15—15 of the casing A when the wedge member is being inserted within the casing through the open upper end thereof.

Although the section wedge member B has been described as being composed of two hollow sections, it will be evident that these sections may be made solid. The hollow construction is designed merely to reduce the weight of the wedge.

The spring resistance D is preferably in the form of a single helical coil disposed within the casing A and bears at its top and bottom ends on the inner ends of the shoes C—C—C and the bottom wall 10 of the casing, respectively. In the assembled condition of the mechanism, the spring D is preferably under a predetermined amount of initial compression.

In assembling the mechanism illustrated in Figures 1 to 8 inclusive, the spring D and the friction shoes C—C—C are first placed within the casing A through the open end thereof. The split wedge member B, collapsed as shown in Figure 6, is then inserted within the open end of the casing, being moved downwardly to the dotted line position shown in Figure 7 with the flange or rib 26 of the section 19 of the wedge member resting on the shoe C at the left hand side of the casing, as seen in Figure 7, and the outer edge of the flange 26 of the section 20 abutting the inner vertical edge of the stop flange 15 at the right hand side of the casing. Downward pressure is then applied to the section 20 of the wedge, forcing the latter inwardly of the casing, as shown in Figure 8, against the spring resisted shoes, thereby camming the sections of the wedge member apart and bringing the rib 26 of the section 19 into underlying relation with respect to the flange 15 at the left hand side of the casing. As continued pressure is applied to the section 20, the wedge member is forced inwardly of the casing until the flange 26 of the section 20 passes beyond the flange 15 at the right hand side of the casing, whereupon the wedge is free to expand to its normal size, and, due to the camming action between the sections thereof, assumes the position shown in Figure 1, the rib 26 of the section 20 snapping under the flange 15 of the casing, and the flat inner end portions of the top and bottom walls 22 and 23 of said sections being brought into abutting relation. The sectional wedge member B is thus expanded to normal size with the upper ends of the sections thereof in horizontal alignment, the retaining flanges 26—26 of the sections 19 and 20 being engaged underneath the flanges 15—15 of the casing and preventing relative lengthwise displacement of the two sections of the wedge member with respect to each other.

The operation of my improved shock absorbing mechanism as shown in Figures 1 to 8 inclusive is as follows: Upon inward movement of the wedge B with respect to the casing A being produced, due to compression of the mechanism, the spring resisted friction shoes are wedged apart and carried inwardly of the casing, compressing the spring D. High frictional resistance is thus provided between the friction surfaces of the shoes and casing. Upon the actuating force being removed, the expansive action of the spring D returns all of the parts to the normal full release position shown in Figure 1, outward movement of the split wedge member B being arrested by shouldered engagement of the flanges 26—26 thereof with the flanges 15—15 of the casing.

Referring next to the embodiment of the invention illustrated in Figures 9 to 13 inclusive, the construction is similar to that shown in Figures 1 to 8 inclusive, with the exception that two, instead of three, friction shoes are employed in the friction shock absorbing mechanism and that the sections of the wedge do not have camming engagement with each other to effect spreading or expansion of the wedge to anchor the same to the casing, the same being manually expanded.

The friction shock absorbing mechanism illustrated in Figures 9 to 13 inclusive comprises broadly a friction casing E of approximately rectangular cross section; a sectional two part wedge member F; two friction shoes G—G; and a spring resistance H.

The friction casing E is of broadly rectangular, transverse cross section, having longitudinally extending, opposed side walls 30—30 and two longitudinally extending, opposed walls 31—31 connecting the side walls 30—30. The walls 30—30, as shown in Figures 10 and 13, are of V-shaped, transverse cross section, the wall portions forming the V being only at a slight inclination with respect to each other. The casing E is open at its upper end and the walls 30—30 thereof at said open end, as shown in Figure 11, present opposed, inwardly converging, V-shaped friction surfaces 32—32 on the interior of the casing. At the open upper end, the casing E has opposed, inturned stop flanges 33—33 which extend from the walls 31—31 thereof, adapted to cooperate with the split wedge member F to limit outward movement thereof.

The friction shoes G—G are disposed at opposite sides of the mechanism and have longitudinally extending friction surfaces 34—34 on their outer sides which are of V-shaped, transverse cross section and slidingly engage the V-shaped friction surfaces 32—32 of the casing. On the inner side, each shoe has a wedge face 35 of V-shaped, transverse cross section extending lengthwise of the shoe.

The wedge member F is lengthwise divided into two sections 36 and 37. The two sections 36 and 37 of the wedge member F are of similar design, except as hereinafter pointed out. Each section of the wedge member F comprises a pair of side walls 38—38, a third side wall 39, and top and bottom walls 40 and 41. The side wall 39 extends vertically and is substantially flat, and the side walls 38—38 extend laterally inwardly from the opposite ends of the side wall 39 in slightly diverging relation. As shown in Figure 11, the side walls 38—38 are also inclined downwardly and inwardly toward the central longitudinal axis of the mechanism. In its assembled condition, the wedge member F presents wedge faces 42—42 at opposite sides thereof formed partly on each of the sections 36 and 37 and comprising the walls 38—38 and 38—38 of said sections. At the lower end, each section of the wedge member F has a laterally outwardly projecting, horizontal retaining flange 43 which extends from the side wall 39 thereof. The flanges 43—43 of the two sections 36 and 37 of the wedge member are at opposite sides of the latter and engage in back of the flanges 33—33 of the casing to limit outward movement of the wedge member. The inner edge of the top wall 40 of the section 37 is flush and in vertical alignment with the inner edges of the side walls 38—38 thereof, and the inner edge of the bottom wall 41 of the section 36 is flush and in vertical alignment with the inner edges of the side walls 38—38 of the section 36. The top wall 40 of the section 36 and the bottom wall 41 of the section 37 project laterally inwardly beyond the inner edges of the respective side walls 38—38 and 38—38 of the two sections, and, in effect, present protruding flanges 44—44 having flat, vertical, inner end faces. The flange 44 of the section 36 bears on the inner edge of the top wall 40 of the section 37 and the flange 44 of the latter bears on the inner edge of the bottom wall 41 of the section 36, thus holding the sectional wedge expanded with the retaining flanges 43—43 thereof engaged beneath the stop flanges 33—33 of the casing E.

The spring H is similar to the spring D hereinbefore described and comprises a helical coil disposed within the casing E and having its top and bottom ends bearing respectively on the inner ends of the friction shoes and the closed bottom end of the casing.

In assembling the mechanism shown in Figures 9 to 13 inclusive, the spring H and the shoes G—G are first placed in the casing and the shoes forced inwardly to a predetermined extent by any suitable tool, such as a two pronged member, and held in said inward position while the wedge is being applied. The sectional wedge member F is inserted within the casing in collapsed condition, the sections 36 and 37 being staggered lengthwise and held together in a manner similar to the sectional wedge shown in Figures 1 to 8 inclusive, so that the flanges 43—43 thereof will pass between the flanges 33—33 of the casing E. In the collapsed condition of the wedge member, the flange 44 of the section 36 is engaged over the inner end of the top wall 40 of the section 37 and the flange 44 of the section 37 is engaged beneath the inner end portion of the bottom wall 41 of the section 36. As will be evident, the retaining flange 43 of the section 37 is thus disposed in offset relation to, or at a level above, the retaining flange 43 of the section 36. The wedge member F is then passed downwardly within the casing until the flange 43 of the section 36 passes below the stop flange 33 at the corresponding side of the casing, the required amount of downward displacement of the wedge member being permitted by the inwardly displaced position of the shoes G—G. The two sections of the wedge are then manually moved apart and brought into horizontal alignment, thereby engaging the top and bottom spreading lugs or flanges 44—44 of said sections respectively with the inner edges of the opposed top and bottom walls 40 and 41 and disposing the flanges 43—43 in underlying relation with respect to the stop flanges 33—33 of the casing. The shoes G—G are then released to be projected upwardly by the spring H into operative engagement with the wedge member F, as shown in Figure 11, thereby bringing the flanges 43—43 of the wedge member into engagement with the bottom sides of the stop flanges 33—33 of the casing, as shown in Figure 9.

The operation of the mechanism shown in Figures 9 to 13 inclusive is substantially the same as that hereinbefore described in connection with the embodiment of the invention shown in Figures 1 to 8 inclusive.

I claim:

1. In a friction shock absorbing mechanism, the combination with a friction casing open at one end and having interior stop shoulders at said open end; of friction shoes having sliding engagement with the interior walls of the casing; spring means yieldingly resisting movement of said shoes inwardly of the casing; a lengthwise divided, sectional, laterally contractible wedge block having wedging engagement with said shoes, said block having laterally outwardly extending retaining projections; and a laterally extending spreading projection on the inner side of each section of said block protruding from said inner side and normally interposed between said section and the adjacent section of said block and engaging the inner side of said last named section to hold said block expanded with the retaining projections engaged in back of the stop shoulders of the casing, the sections of said block being displaceable lengthwise with respect to each other to withdraw said spreading projection from said interposed condition and effect collapse of the wedge block to permit lateral inward withdrawal of said retaining projections from in back of said stop shoulders.

2. In a friction shock absorbing mechanism, the combination with a friction casing open at one end and having inturned stop flanges at said open end; of a plurality of friction shoes having sliding frictional engagement with the interior of the casing; a spring within the casing yieldingly resisting inward movement of the shoes; a two piece, sectional, lengthwise divided, laterally collapsible wedge block having wedging engagement with the shoes, the sections of said block having laterally outwardly projecting retaining flanges engageable in back of the flanges of the casing to limit outward movement of the block; and a laterally inwardly projecting spacing flange on the end of each of said sections of the wedge block on the inner side thereof, the spacing flange of one of said sections being at the outer end thereof and the spacing flange of the other section being at the inner end, the spacing flange of each of said sections of the block being normally interposed between said last named section and the other section in engagement with the inner side of said other section to hold the block expanded with the retaining flanges thereof engaged with the stop flanges of the casing, the sections of said block being displaceable lengthwise with respect to each other to withdraw said spacing flanges from said interposed condition and effect collapse of said wedge block to permit lateral inward withdrawal of said retaining flanges from in back of said stop flanges.

3. In a friction shock absorbing mechanism, the combination with a friction casing open at one end and having interior, opposed stop shoulders at said open end; of a plurality of friction shoes having sliding frictional engagement with the interior walls of the casing; spring means within the casing yieldingly resisting inward movement of the shoes; and a two piece, lengthwise divided, laterally contractible, sectional wedge block, the sections of said block having wedging engagement with said shoes, said sections having shouldered engagement respectively with the stop shoulders of the casing to limit outward movement of the block, one of said sections having a spreading projection at the outer end thereof extending from its lateral inner side, and the other of said sections having a spreading projection at the inner end thereof extending from its lateral inner side, said spreading projection of each section and being normally interposed between said section and the other section and engaging the lateral inner side of the latter to hold said sections spread apart in shouldered engagement with the stop shoulders of the casing, the sections of said block being displaceable lengthwise with respect to each other to withdraw said spreading projections from said interposed condition and effect collapse of said wedge block to permit lateral inward withdrawal of said sections from shouldered engagement with said stop shoulders.

4. In a friction shock absorbing mechanism, the combination with a friction casing open at one end and having inturned, opposed stop flanges at said open end; of a plurality of friction shoes having sliding frictional engagement with the interior walls of the casing; spring means within the casing yieldingly resisting inward movement of said shoes; a sectional wedge member split lengthwise into two sections, each section having a laterally outwardly projecting retaining flange engaged in back of one of the corresponding stop flanges of the casing; and a laterally inwardly projecting filler flange on the inner side of each section of the wedge member, said filler flanges of said respective sections being at opposite ends of the wedge member, the filler flange of each section being normally interposed between said section and the other section, and having bearing engagement with the inner side of said other section to hold said sections spread apart with the retaining flanges thereof engaged in back of the stop flanges of the casing the sections of said block being displaceable lengthwise with respect to each other to withdraw said filler flanges from said interposed condition and effect collapse of the wedge block to permit lateral inward withdrawal of said sections and the retaining flanges thereof from in back of the stop flanges of the casing 5. In a friction shock absorbing mechanism, the combination with a friction casing open at one end and having inturned, opposed stop flanges at said open end; of a plurality of friction shoes having sliding frictional engagement with the interior walls of the casing; spring means within the casing yieldingly resisting inward movement of the shoes; a sectional wedge member split lengthwise into two sections, each section having a laterally outwardly projecting retaining flange engageable in back of the stop flange at the corresponding side of the casing, one of the sections having a laterally inwardly projecting spacing flange on the inner side thereof at its outer end, and the other of said sections having a laterally inwardly projecting spacing flange on the inner side thereof at its inner end, the spacing flange of each section being normally interposed between said section and the other section and bearing on the inner side of said other section to hold said sections spread apart with the retaining flanges engaged in back of said stop flanges of the casing, the sections of said block being displaceable lengthwise with respect to each other in reverse directions to withdraw said spacing flanges from said interposed condition and effect collapse of the wedge block to permit lateral inward withdrawal of said sections and the retaining flanges thereof from in back of the stop flanges of the casing.

6. In a friction shock absorbing mechanism, the combination with a friction casing open at one end and having opposed, interior stop flanges at said open end; of a plurality of friction shoes slidable within said casing; a spring within the casing yieldingly opposing inward movement of the shoes; and a lengthwise divided, two part sectional wedge block having wedging engagement with the shoes, said sections of said block having retaining flanges engageable with said stop flanges to arrest outward movement of the block, each of said sections having a lateral inward enlargement on the inner side at one end thereof, the enlargements of said sections being respectively at opposite ends of the wedge block and the enlargement of each section being normally interposed between said section and the other section and bearing on the inner side of said other section to hold said wedge block expanded with the flanges thereof engaged in back of the flanges of the casing, the sections of said block being displaceable lengthwise with respect to each other in opposite directions to withdraw said enlargements from said interposed condition and effect collapse of the wedge block to permit lateral inward withdrawal of said sections and the retaining flanges thereof from in back of the stop flanges of the casing.

7. In a friction shock absorbing mechanism, the combination with a friction casing open at one end and having opposed, inturned stop flanges at said open end; of three friction shoes arranged symmetrically about the axis of the mechanism and having sliding frictional engagement with the interior walls of the casing, each shoe having a wedge face on the inner side thereof; a lengthwise split, wedge between said shoes comprising two sections, said split wedge having three wedge faces arranged symmetrically about the longitudinal axis of the mechanism, said faces engaging said wedge faces of said shoes respectively, two of said wedge faces of the wedge being provided respectively on said sections and the third wedge face being formed partly on each of said sections, each of said sections having a laterally outwardly projecting retaining flange, said flanges being at opposite sides of the mechanism and engaging said stop flanges of the casing to limit outward movement of the wedge; an abutment on the inner side of each section of the wedge at one end thereof; a lateral inward enlargement on each section of the wedge at the opposite end thereof extending beyond said abutment, the enlargement of each of said sections normally engaging the inner side of the abutment of the other section of the wedge to hold the latter expanded with the retaining flanges thereof engaged with the stop flanges of the casing, the sections of said wedge being displaceable lengthwise with respect to each other to withdraw said enlargements from engagement with said abutments to effect collapse of the wedge and withdrawal of said retaining flanges from the stop flanges; and spring means within the casing yieldingly resisting inward movement of the shoes.

8. In a friction shock absorbing mechanism, the combination with a friction casing open at one end, said open end being of hexagonal, interior cross section and presenting three interior, inwardly converging friction surfaces of V-shaped cross section, each V-shaped surface comprising two adjacent walls of said hexagonal, interior of the casing; of a pair of inturned stop flanges at the open end of the casing projecting from two opposite sides of the hexagonal, interior thereof; three friction shoes slidingly telescoped within the casing, each of said shoes having an outer, V-shaped friction surface slidingly engaging the corresponding V-shaped friction surface of the casing, and a wedge face on the inner side thereof of V-shaped transverse section; a lengthwise split wedge of hexagonal shape, comprising two sections and having six inwardly converging surfaces at its rear end and arranged symmetrically about the central longitudinal axis of the mechanism, adjacent of said surfaces, forming a V-shaped wedge face engaging the V-shaped wedge face of the corresponding shoe, three of said surfaces being formed on each section of the wedge, each of said sections having a laterally outwardly projecting retaining flange, said retaining flanges being at opposite sides of the wedge and engaging said stop flanges of the casing to limit outward movement of the wedge; an abutment on the inner side of each section at one end thereof; a laterally inwardly projecting spacing flange on the inner side of each section of the wedge at the other end thereof normally engaging the inner side of the abutment of the other section to hold the wedge spread apart, the sections of said wedge being displaceable lengthwise with respect to each other to withdraw said spacing flanges from engagement with said abutments to effect collapse of the wedge and withdrawal of said retaining flanges from said stop flanges; and a spring within said casing yieldingly opposing inward movement of the shoes.

9. In a friction shock absorbing mechanism, the combination with a friction casing of rectangular cross section open at one end and having a pair of interior friction surfaces at said open end converging inwardly of the casing, said friction surfaces being formed on two opposed walls of the casing; of interior stop flanges at the open end of the casing extending from the remaining two opposed walls of said casing; a pair of friction shoes having outer friction surfaces engaging the friction surfaces of the casing, each of said shoes having a wedge face on its inner side; a lengthwise divided wedge member between said shoes comprising two sections, said wedge member having a pair of wedge faces opposed to said wedge faces of the shoes and engageable therewith, each wedge face being formed partly on each section of the wedge member; a laterally outwardly projecting retaining flange on each section of the wedge, said retaining flanges being at opposite sides of the wedge and engaging the stop flanges of the casing; an abutment on the inner side of each section at one end thereof; a laterally inwardly projecting spacing flange on the inner side of each section of the wedge member at the other end thereof, normally engaging the inner side of the abutment of the other section of said member to hold the latter spread apart, the sections of said member being displaceable lengthwise with respect to each other to withdraw said spacing flanges from engagement with said abutments to effect collapse of the wedge member and withdrawal of said retaining flanges from said stop flanges; and spring means within the casing yieldingly opposing inward movement of the shoes.

10. In a friction shock absorbing mechanism, the combination with a friction casing open at one end and having interior stop shoulders at said open end; of friction shoes having sliding engagement with the interior walls of the casing; spring means within the casing yieldingly resisting movement of said shoes inwardly of the casing; a laterally contractible, lengthwise divided, sectional wedge block having wedging engagement with said shoes, said block having laterally outwardly extending retaining projections on the sections thereof; and spacing means on each section engaging the adjacent section of said block for normally holding said block expanded with the retaining projections engaged in back of the shoulders of the casing; the sections of said block being displaceable lengthwise with respect to each other to withdraw said means from said interposed condition and effect collapse of the wedge block to permit lateral inward withdrawal of said retaining projections from in back of said stop shoulders.

GEORGE E. DATH.

REFERENCES CITED

The following references are of record in the file of this patent:

UNITED STATES PATENTS

| Number | Name | Date |
| --- | --- | --- |
| 2,076,769 | Dentler | Apr. 13, 1937 |
| 2,360,478 | Dath | Oct. 17, 1944 |
| 2,366,818 | VanLoan, Jr. | Jan. 9, 1945 |
| 2,370,291 | Dath | Feb. 27, 1945 |